United States Patent
Amacker

(10) Patent No.: US 8,977,982 B1
(45) Date of Patent: Mar. 10, 2015

(54) TECHNIQUES FOR NAVIGATING INFORMATION

(75) Inventor: Matthew Amacker, San Jose, CA (US)

(73) Assignee: A9.com, Inc., Palo Alto, CA (US)

(*) Notice: Subject to any disclaimer, the term of this patent is extended or adjusted under 35 U.S.C. 154(b) by 804 days.

(21) Appl. No.: 12/790,591

(22) Filed: May 28, 2010

(51) Int. Cl.
G06F 3/048 (2013.01)
G06F 3/01 (2006.01)

(52) U.S. Cl.
CPC ............... *G06F 3/014* (2013.01); *G06F 3/048* (2013.01)
USPC ........................... 715/787; 715/786; 715/784

(58) Field of Classification Search
CPC ................................. G06F 3/014; G06F 3/048
USPC .................... 715/764, 784, 786, 787
See application file for complete search history.

(56) References Cited

U.S. PATENT DOCUMENTS

| | | | | |
|---|---|---|---|---|
| 5,510,808 A | * | 4/1996 | Cina et al. | 345/684 |
| 5,550,969 A | * | 8/1996 | Torres et al. | 715/787 |
| 5,903,267 A | * | 5/1999 | Fisher | 715/786 |
| 6,983,331 B1 | * | 1/2006 | Mitchell et al. | 709/246 |
| 2002/0186252 A1 | * | 12/2002 | Himmel et al. | 345/787 |
| 2004/0164998 A1 | * | 8/2004 | Jung et al. | 345/619 |
| 2005/0005246 A1 | * | 1/2005 | Card et al. | 715/776 |
| 2008/0104515 A1 | * | 5/2008 | Dumitru et al. | 715/730 |
| 2008/0178116 A1 | * | 7/2008 | Kim | 715/786 |
| 2008/0201315 A1 | * | 8/2008 | Lazier et al. | 707/5 |
| 2008/0297536 A1 | * | 12/2008 | Matsuno et al. | 345/684 |
| 2009/0070707 A1 | * | 3/2009 | Schaller et al. | 715/787 |
| 2010/0030302 A1 | * | 2/2010 | Blowers et al. | 607/60 |

* cited by examiner

*Primary Examiner* — William Bashore
*Assistant Examiner* — Gregory A Distefano
(74) *Attorney, Agent, or Firm* — Novak Druce Connolly Bove + Quigg LLP

(57) ABSTRACT

Techniques described and suggested herein include systems and methods for navigating content in the form of a scrollable information sets. In an embodiment, a portion of a scrollable information set is displayed on a user device. As the user navigates through the information set, one or more location indicators are modified. The location indicators each correspond to a position within the information set and are configured to facilitate user input for navigating to a corresponding position within the information set.

20 Claims, 8 Drawing Sheets

TECHNIQUES FOR NAVIGATING INFORMATION

BACKGROUND

Information sets, such as groups of search results or other types of related information, are often too large to be practically displayed on a display, such as a display screen of a computing device. Performing a search with an Internet search engine, for example, may result in hundreds, thousands, or more search results, which a user typically would not be able to view in groups of more than a few at a time. Information sources such as Web logs (blogs) may be comprised of numerous consecutive entries in a single electronic document that collectively occupy more space than can be concurrently displayed on a display. Further, many other types of electronic documents typically contain more content than can be practically displayed all at one time. The inability to display more than a portion of an information set at any given time can present difficulties for a user attempting to navigate through the information set.

Various techniques have been developed to facilitate user navigation through these large information sets. For example, information sets are often divided into a set of separate documents or pages of information. Search results, for instance, are often provided to users sequentially in separate Hypertext Markup Language (HTML) documents, each document having a subset of the results. Users can navigate from one document of the search results to another in order to find what they are seeking. As another example, graphical user interfaces often include scroll bars that users can manipulate in order to navigate through content, thereby causing different portions of a document to be displayed depending on a position of a scroll bar's thumb. Sophisticated scroll bars (sometimes referred to as "forever scroll bars") have been developed to allow incremental loading of an information set. Generally, a portion of an information set is presented to a user with a scroll bar. When the user moves the thumb of the scroll bar to a position proximate the end of the scroll bar, more of the information set is provided to the user to scroll through. While these and other techniques are useful, they are often cumbersome for users as they typically require navigating to different pages to access different portions of an information set and/or use of a scroll bar whose behavior unintuitively changes during use.

DETAILED DESCRIPTION

Figure 1:
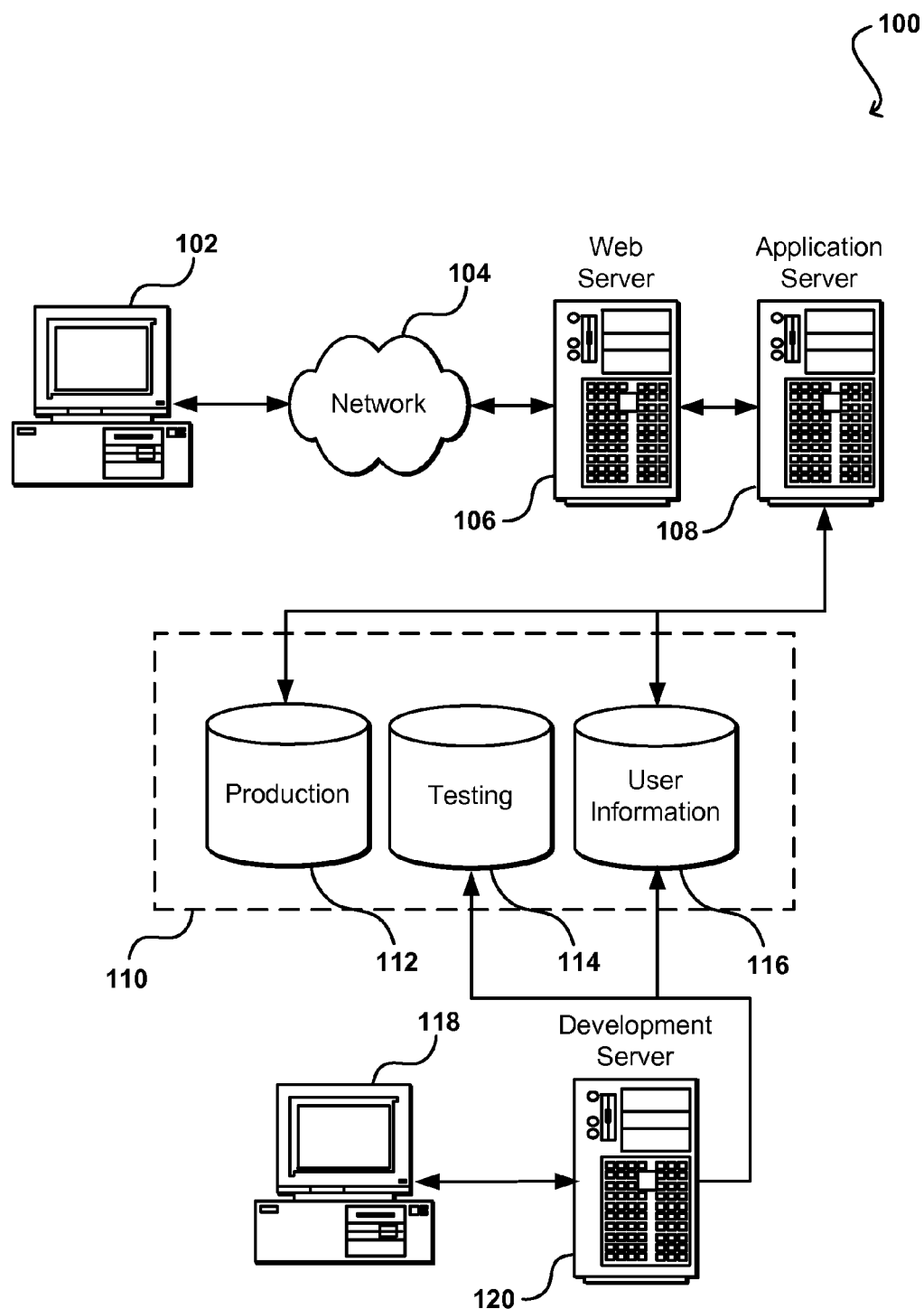
FIG. 1 illustrates an environment in which various embodiments can be implemented.

Various techniques described and suggested herein include systems and methods for navigating data sets, also referred to herein as information sets. In one embodiment, a user request for information is received and an information set responsive to the request is identified. The request may be a search request submitted through a search engine web site and the information set may be a set of search results responsive to the search request. Access to the identified information set is provided to the user in a manner enabling the user to scroll (or otherwise similarly navigate) through the information set. Scrolling through the information set may be accomplished by user input through a graphical user interface. The user input may be performed in connection with one or more scrolling or other navigational control or element of the interface, such as a scroll bar of the interface, gestures on a touch screen device, grabbing operations with a mouse or touchpad, rotation of a scroll wheel on a mouse, and/or through other such input. The interface may include location indicators that each correspond to a position within the information set and that each location indicator provides an indication of input that may be used to cause a corresponding portion of the information set to be displayed. For instance, the location indicators may be numbers on a scroll bar having a thumb, where the numbers correspond to a numbering of search results and where each number on the scroll bar is positioned to indicate a position on the scroll bar to which the thumb may be moved by user input to cause a corresponding search result to be displayed.

In an embodiment, the location indicators of the interface dynamically change responsive to user input for navigating through the information set. As an example, the location indicators may be numbers corresponding to numbered search results and may indicate a position on a scroll bar to which a thumb of the scroll bar may be moved to navigate to corresponding search results. As a user navigates to higher numbered search results, the differences between consecutive numbers indicating positions on the scroll bar (e.g., graduation values on a scale of result numbers) may increase. For instance, if search results numbered 1 through 10 have been presented to the user, the numbers 1 through 10 may appear on the scroll bar. If the user navigates to the hundredth search result, numbers 10 through 100 that are divisible by 10 may replace the numbers 1 through 10 on the scroll bar in order to indicate to the user a location to which a thumb of the scroll bar may be moved in order to display search results proximate to the displayed numbers. Thus, for example, if the user currently has the hundredth search result displayed, but remembers that a relevant search result appeared near the fiftieth search result, the user would know that he or she can move the thumb of the scroll bar to the number 50 in order to display the fiftieth search result and those proximate to that search result.

In an embodiment, the scrolling control is a scroll bar that is manipulable by the user and for which the results of manipulation dynamically change as the user navigates through the information set. For example, locations on the scroll bar are mapped to positions in the information set such that an upper location of the scroll bar is mapped to a beginning portion of the information set and a lower location of the scroll bar is mapped to an intermediate portion of the information set, with locations between the upper and locations on the scroll bar mapped to corresponding positions between the beginning and intermediate portions of the information set. As a user moves the scroll thumb past the lower location, the map of the scroll bar to the information set changes such that the lower location is mapped to another intermediate portion of the information set past the original intermediate portion. The map of locations on the scroll bar between the upper and lower locations change accordingly. The size of the thumb of the scroll bar relative to the size of the scroll bar may change as well, becoming smaller the further through the information set the user has navigated. In this embodiment, portions of the information set may be accessed by a user system incrementally. In the context of search results, for example, user movement of the thumb past a certain location on the scroll bar may trigger loading of additional search results and may trigger modification of the location indicators to take into account the additionally loaded search results, such as by modifying a map as described in the preceding paragraph.

In another embodiment, locations on a scroll bar may be mapped to the information set even if the complete information set has not been loaded. Portions of the information set may be incrementally loaded in response to user navigation indicative of a desire to access an unloaded portion of the information set. A mapping of the information set that indicates which portions of the information set have been loaded may be provided. In the context of search results, for example, a set of search results may be identified based on a user-submitted search query. An initial portion of the search results, such as the first ten results, may be sent to a user computing device for display with a scroll bar. Locations on the scroll bar may be mapped to search results that have not been sent to the user computing device, such as the last search result identified. As the user moves the thumb of the scroll bar (or navigates using alternate input) search results are sent to the user computing device accordingly. Locations on the scroll bar corresponding to search results that have been received by the user computing device may be marked to identify to the user corresponding search results that have been loaded. For example, a set of 10,000 search results may be identified based at least in part on a user-submitted search query. Locations on a scroll bar may be mapped to the 10,000 search results while only ten search results may be initially sent to the user's computing device. The user may move the thumb of the scroll bar to a middle location of the scroll bar to see whether search results around the five-thousandth search result are still relevant to the search query. Search results around the five-thousandth search result may be sent to the user computing device, while the search results between the initially-loaded search results and the newly-loaded search results are not sent to the user computing device. If the user moves the scroll thumb from the middle position, a mark may appear on the scroll bar at the middle location to indicate to the user that search results corresponding to that location have been loaded. As the user moves the thumb to other locations and corresponding search results are loaded, the other locations may also be marked. In this manner, the user may quickly move the thumb to a marked location, for instance, to have displayed a search result that he or she has seen before.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

FIGS. 2A through 2F show various views of an illustrative interface, in accordance with various embodiments, which may be displayed on a display of the client device 102, described above. In the illustrated embodiment, the context of search results sent to a client device by a search engine is shown, although other contexts are contemplated within the scope of in the present disclosure. Beginning with FIG. 2A, the figure shows a web page 200 of a search engine showing search results returned in response to a user-entered search query. The web page shows the first three search results and a portion of the fourth. A scroll bar 202 is provided to enable a user to navigate through the search results. As shown, the scroll bar 202 includes a thumb 204, which a user may move relative to the scroll bar 202 with appropriate user input. User input for moving the thumb may include input using a suitable input device, such as a mouse, scroll wheel, touch screen, keyboard, or other suitable device. In an embodiment, movement of the thumb 204 downward causes display of search results subsequent to the search results presently displayed. For instance, downward movement of the thumb in FIG. 2A may cause the fourth search result to be completely displayed in the interface 200.

As shown in the figure, the web page 200 includes a location indicator 206 on the scroll bar 202. In an embodiment, the location indicator is a number displayed on the scroll bar 202 corresponding to the number of a search result and positioned such that movement of the thumb 204 to the location indicator causes the corresponding search result to display. In the specific example of FIG. 2A, the location indicator 206 is a number "4" on the scroll bar positioned such that if the center of the thumb 204 is moved to the number 4 location indicator, the fourth search result is displayed in the interface 200. While the use of numbers as location indicators is convenient for providing users an indication of where in the search results the number corresponds, other location indicators may be used. Location indicators may be dots, arrows, or generally any graphic device. As another example, search results or other information sets may be categorized into a plurality of ordered categories. Location indicators may correspond to locations in the information set where a transition from one category to another is made. If, for instance, the information set was a set of items available for consumption (such as consumer products, digital downloads, hotel rooms, services, and the like), the items may have been rated according to a star system, where the higher the number of stars assigned to an item, the higher the rating. Location indicators may, for instance, be stars, the number of which for a particular location indicator indicate the beginning of a category in the set of items. Thus, for example, four stars on or proximate to a scroll bar may indicate to a user that he or she may move a scroll thumb to the four stars to scroll to navigate to a location in the information set where items having received four stars are located. As yet another example, if items in an information set correspond to items of clothing, location indicators may indicate some characteristic of the clothing by which the clothing is categorized, such as size, price, designer, color, and the like. Generally, information sets may be organized by any category and the location indicators may indicate to users input that may be used in order to scroll to a corresponding category. Categorizations may be selectable by users such that, if a user, through user input, directs an information set to be categorized according to a different category than a current categorization, the location indicators may change to reflect the selected categorization. A user may, for instance, have performed a search for consumer products. Results of the search may be presented to the user according to price, and location indicators may indicate to the user how to scroll to items of a certain price range. If the user then indicated that he or she wants to order the search results by manufacturer, the location indicators may change to indicate how to scroll to search results of particular manufacturers. In addition to the foregoing, location indicators may be located in other locations than shown in the illustrative embodiment shown in the figures. For instance, location indicators may be located next to the scroll bar 202, or in any suitable location.

In the illustrative example shown in FIGS. 2A-2F, the scroll bar 202 is a forever scroll bar. A forever scroll bar may be a scroll bar whose responsiveness to user input incrementally changes to allow scrolling through larger and larger portions of an information set. In this embodiment, the scroll bar 202 is mapped to a subset of the search results identified as responsive to the user-entered search query. For example, as shown FIG. 2A, the scroll bar 202 is mapped to the first four search results identified as responsive to the user-entered search query, where more than four search results are identified as responsive to the query. Nevertheless, the scroll bar 202 is usable by the user to navigate to subsequent search results (search results past the fourth search result) without navigating to another page. In an embodiment, such functionality is accomplished through the use of Asynchronous JavaScript® and XML (AJAX) technology. For instance, when a user enters a search query, through a web site of a search engine, the search engine website may return a subset of search results responsive to the query with JavaScript® code that enables a web browser of the user to display the response to the search query in a dynamic manner. The JavaScript® code instructs the user's web browser to monitor the position of the thumb 204 relative to the scroll bar 202. When the thumb 204 is within a certain distance from the lower end of the scroll bar 202, the JavaScript® code instructs the browser to instruct additional search results from the web server of the search engine, which the web server of the search engine typically sends. Additionally, in an embodiment, the JavaScript® code instructs the browser to modify the scroll bar 202 to enable the user to scroll through the newly loaded search results as well as the previously-loaded search results. Modification of the scroll bar 202 may include decreasing the length of the thumb 204 as well as causing the thumb 204 to be displayed higher on the scroll bar 202. Every time the user moves the thumb 204 to within a certain distance of the end of the scroll bar 202, if there are still search results responsive to the query that have not been received by the user computing device, more results are loaded (requested and received from the search engine web server, in an embodiment) and the scroll bar 202 is modified accordingly.

Figure 2A:
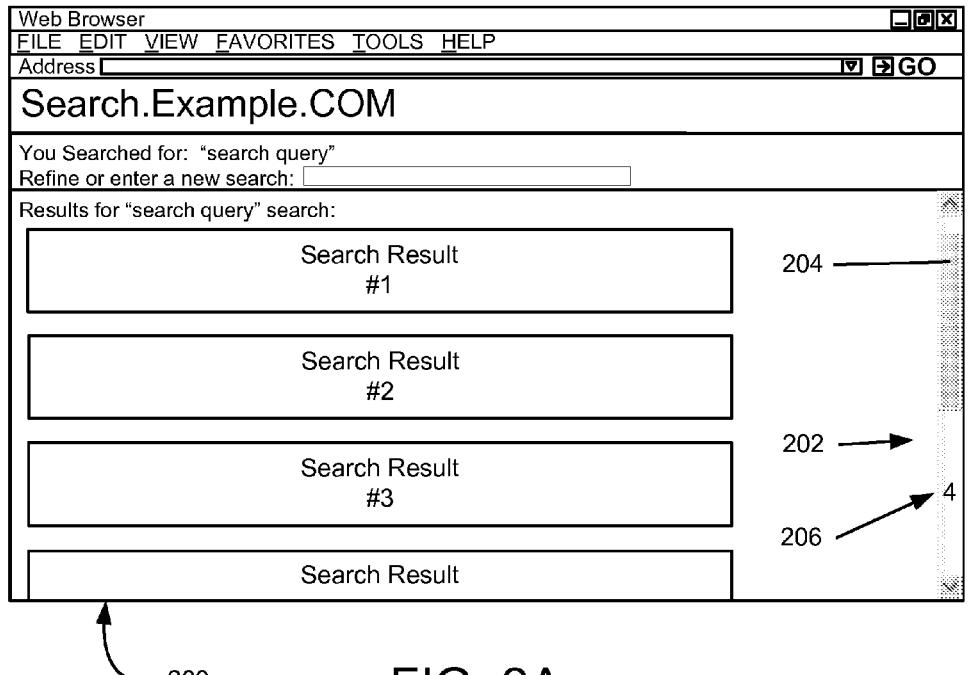
FIGS. 2A-2F show examples of an interface illustrating an embodiment involving a scroll bar.
Figure 2B:
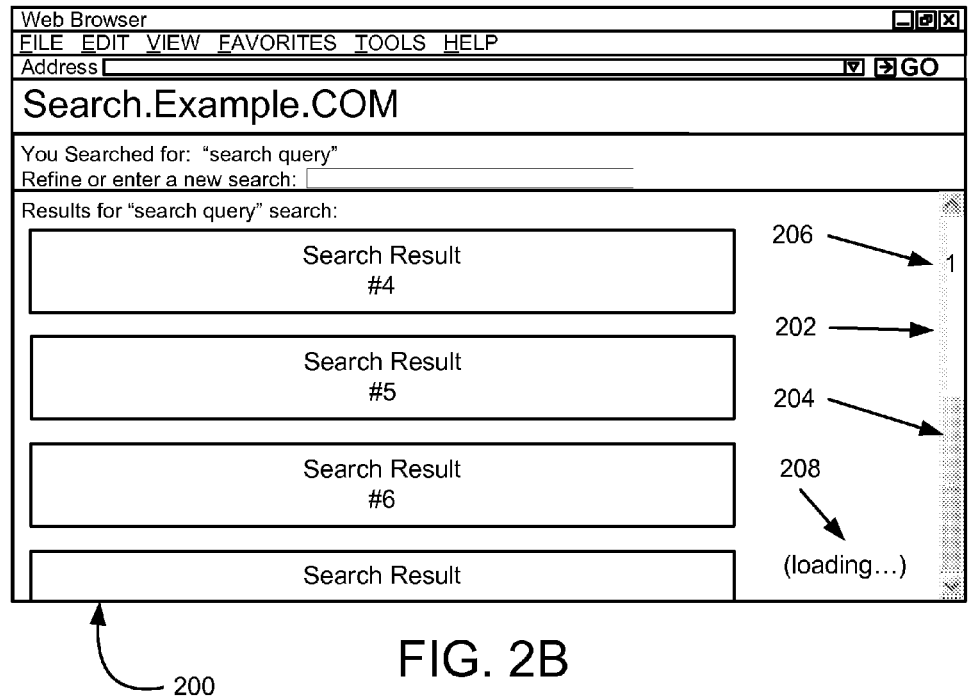

For instance, turning to FIG. 2B, the thumb 204 has been moved to the lower end of the scroll bar 202, centered on the number 4 location indicator on the scroll bar 202 shown in FIG. 2A. As a result, the fourth search result is displayed at the top of the web page 200, and the fifth and sixth search results become visible as well. In response to the user having moved the thumb 204 to this position, the user's browser has requested additional search results from the search engine web server, as indicated by a status indicator 208 that tells the user that results are loading. Also, a location indicator 206 showing the number "1" becomes visible on the scroll bar 202 in a position indicating to the user that the user can move the center of the thumb 204 to the number 1 position indicator in order to cause the first search result to be displayed at the top of the web page 200.

Figure 2C:
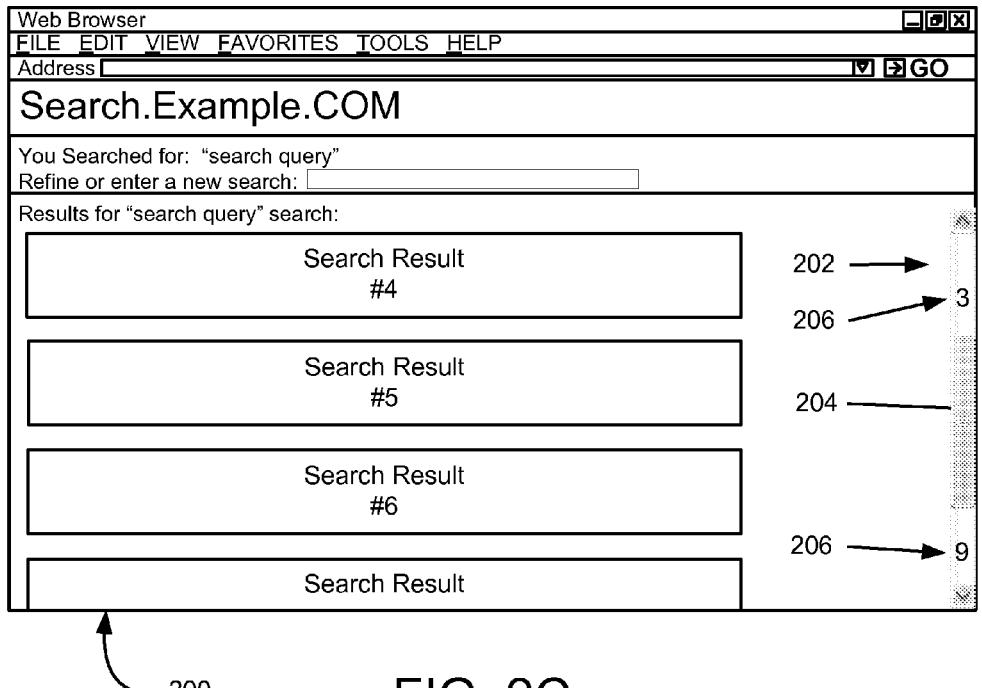

When new search results are loaded, in an embodiment and as shown in FIG. 2C, the thumb 204 is decreased in size and moved by the browser to a higher position. In addition, the location indicators 206 are changed according to the number of search results that have been loaded. Thus, in FIG. 2C the "4" and "1" are removed and the numbers "3" and "9" appear to indicate to the user that the center of the thumb 204 may be moved to the "3" to cause the third search result to be displayed at the top of the web page 200 and may be moved to the "9" to cause the ninth search results to be displayed at the top of the web page 200.

Figure 2D:
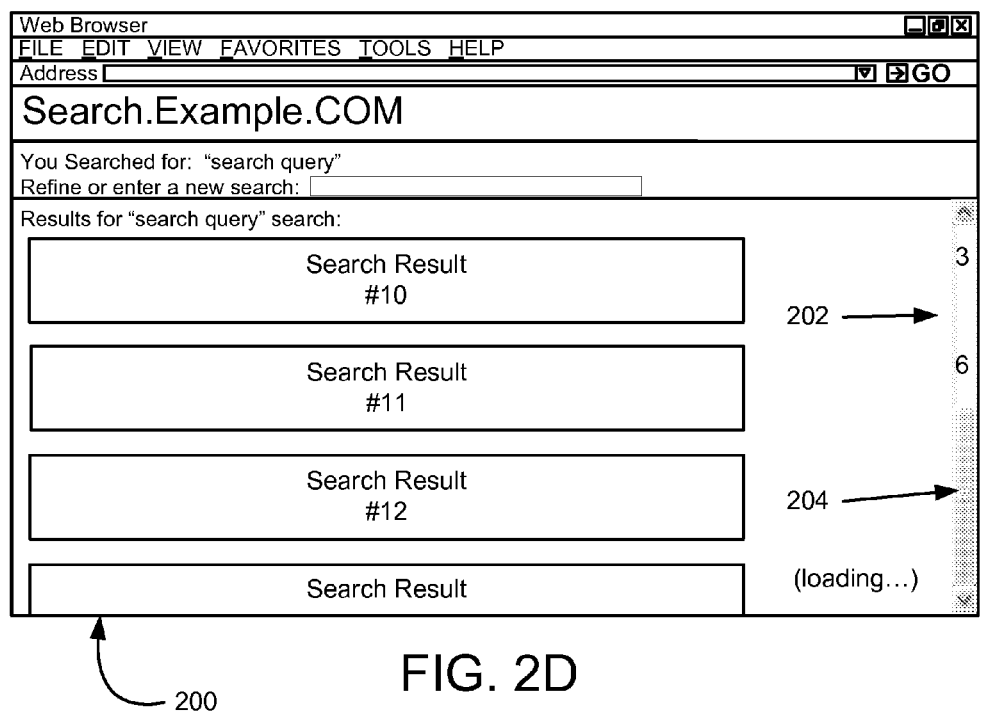
Figure 2E:
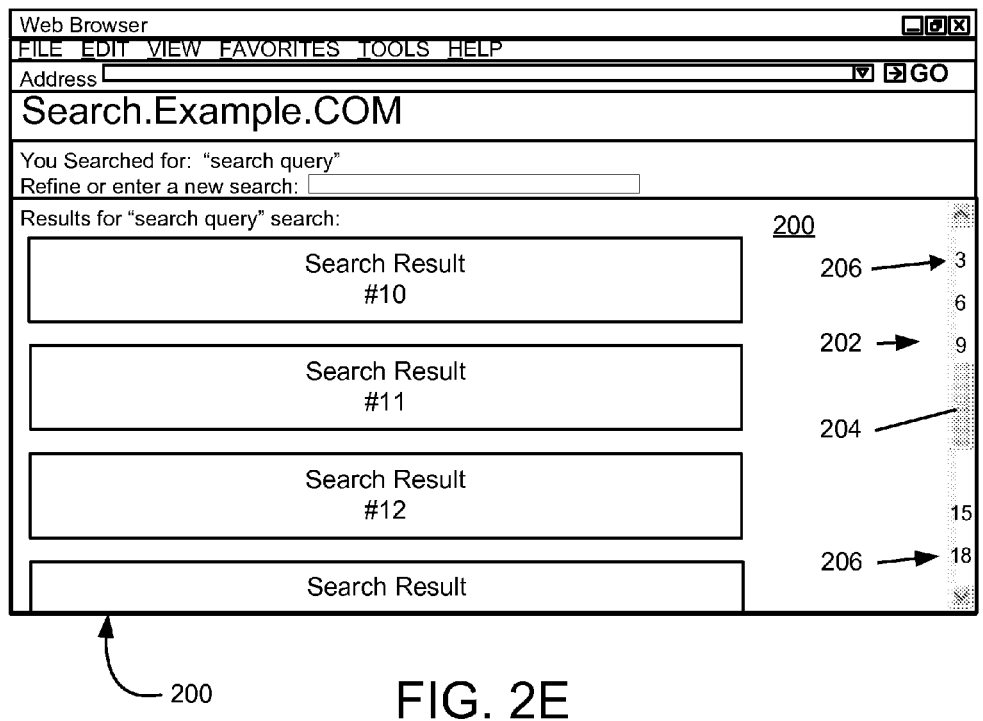

Accordingly, as shown in FIG. 2D, the user has moved the center of the thumb 204 past the number 9 location indicator 206 and the tenth search result is shown at the top of the web page 200. In this example, this location on the scroll bar 202 is near the lower end of the scroll bar 202 and, as described above in connection with FIG. 2B, a status indicator 208 appears indicating that additional search results are loading and the scroll bar 202 is modified. As shown in FIG. 2E, the thumb 204 has decreased in size and has shifted upward relative to the scroll bar 202 to allow for scrolling to additional search results, as described above. In addition, set of location indicators 206 has changed in accordance with a larger set of search results than shown in FIGS. 2C-2D. Specifically, the numbers between "3" and "18" that are divisible by 3 are evenly placed in order on the scroll bar 202 to indicate to the user corresponding positions on the scroll bar 202 to which the center of the thumb 204 may be moved in order to cause a corresponding search results to be displayed at the top of the web page 202. The numbers "3" and "6" are higher relative to the scroll bar 202 and spaced closer to one another in FIG. 2E than in FIGS. 2C and 2D. Thus, in this figure, the thumb 204 is movable to allow scrolling through approximately eighteen search results and location indicators indicate locations on the scroll bar 202 the center of the thumb 204 may be moved in order to cause corresponding search results to be displayed at the top of the web page 200.

Figure 2F:
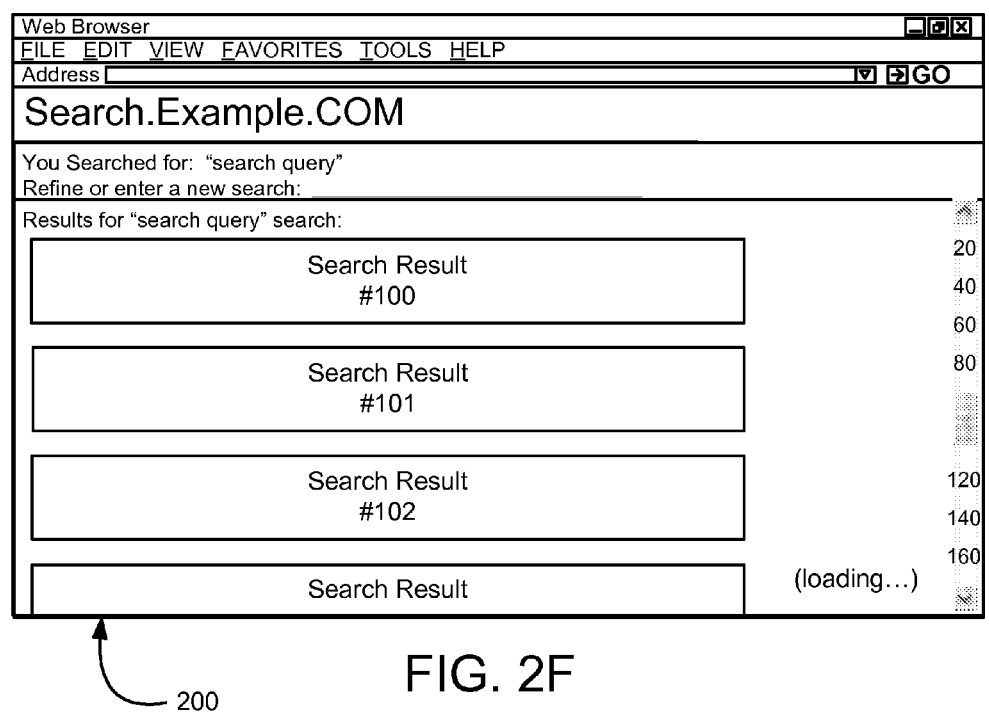

In an embodiment, the user may repeatedly move the thumb 204 to the end of the scroll bar 202 in order to change the thumb 204 to allow scrolling through larger and larger search result sets. The thumb 204 may successively decrease in size until it reaches a minimum size. Each time the user moves the thumb 204 to the lower end of the scroll bar 202, the location indicators 206 on the scroll bar 202 adjust accordingly. For example, the distance between consecutive location indicators 206 on the scroll bar 202 may increase as the user scrolls to higher search results. Looking to FIG. 2F, for example, the user has scrolled to approximately the one-hundred and sixtieth search result. Reaching this search result may have been accomplished, for instance, by the user moving the thumb 204 to the end of the scroll bar 202 several times. In FIG. 2F, instead of a distance of three between values of consecutive location indicators, the distance between location indicator values has increased to twenty. In this manner, as discussed above, if the user remembers that he or she saw a search result of interest, the location indicators inform the user as to where the thumb 204 may be moved relative to the scroll bar 202 to cause display of the search result. By increasing the distance between values of consecutive location indicators, an overcrowding of location indicators on the scroll bar 202 is avoided.

While FIGS. 2A-2F and the corresponding description describe a particular example of an embodiment, variations and enhancements are contemplated. For example, as noted, the location indicators may have a different appearance and may not be located on a scroll bar. The location indicators, for instance, may be located adjacent a scroll bar. As another example, location indicators may be selectable by a user. As an alternative to moving a thumb of a scroll bar to the location indicator, a user may select a location indicator, such as with a mouse input device or by touching an appropriate location on a touch screen, in order to cause a corresponding search result to be displayed. Also, the above description corresponds to a particular embodiment of a forever scroll bar where a scroll bar is mapped to a portion of a set of search results and, as the user scrolls further through the search results, the scroll bar is mapped to larger and larger portions of the search results. However, other embodiments are also possible. For example, an upper end of a scroll bar may not always be mapped to a first search result in certain embodiments, but the upper end of the scroll bar may be mapped to a later search result upon user navigation past a particular search result. In such embodiments, the upper portion of the scroll bar may exhibit characteristics similar to the lower portion of the scroll bar described above. In this instance, the location indicators may change according to a current mapping of the scroll bar.

Variations of the behavior of a graphic interface incorporating elements of the present disclosure may also differ from the behavior described above. For instance, as noted above, in various embodiments, movement of the center of a scroll thumb to a location indicator causes corresponding search results to be displayed at the top of a web page. However, movement of the top of a thumb to a location indicator, in some embodiments, may accomplish the same result, as may movement of a bottom of a thumb to a location indicator. Also, movement of a particular portion of a location indicator may cause a corresponding search result to be displayed not at the top of a web page, but in the center of a display device, or the center of a web page, or, generally, in any particular location. Other variations may include variations of the interface as presented to a user. For instance, while FIGS. 2A-2F show an illustrative example of an interface in which search results are presented on a two-dimensional display. Information, however, may be provided in different ways and using other types of displays. In an embodiment, search results or other sets of information are rendered and displayed on a two-dimensional display in order to provide an effect that a user is scrolling in a three-dimensional environment. For instance, a scroll bar may be presented with a perspective that gives a visual impression that the top of the scroll bar is deeper into a display than the bottom of the scroll bar, or vice versa.

Figure 3:
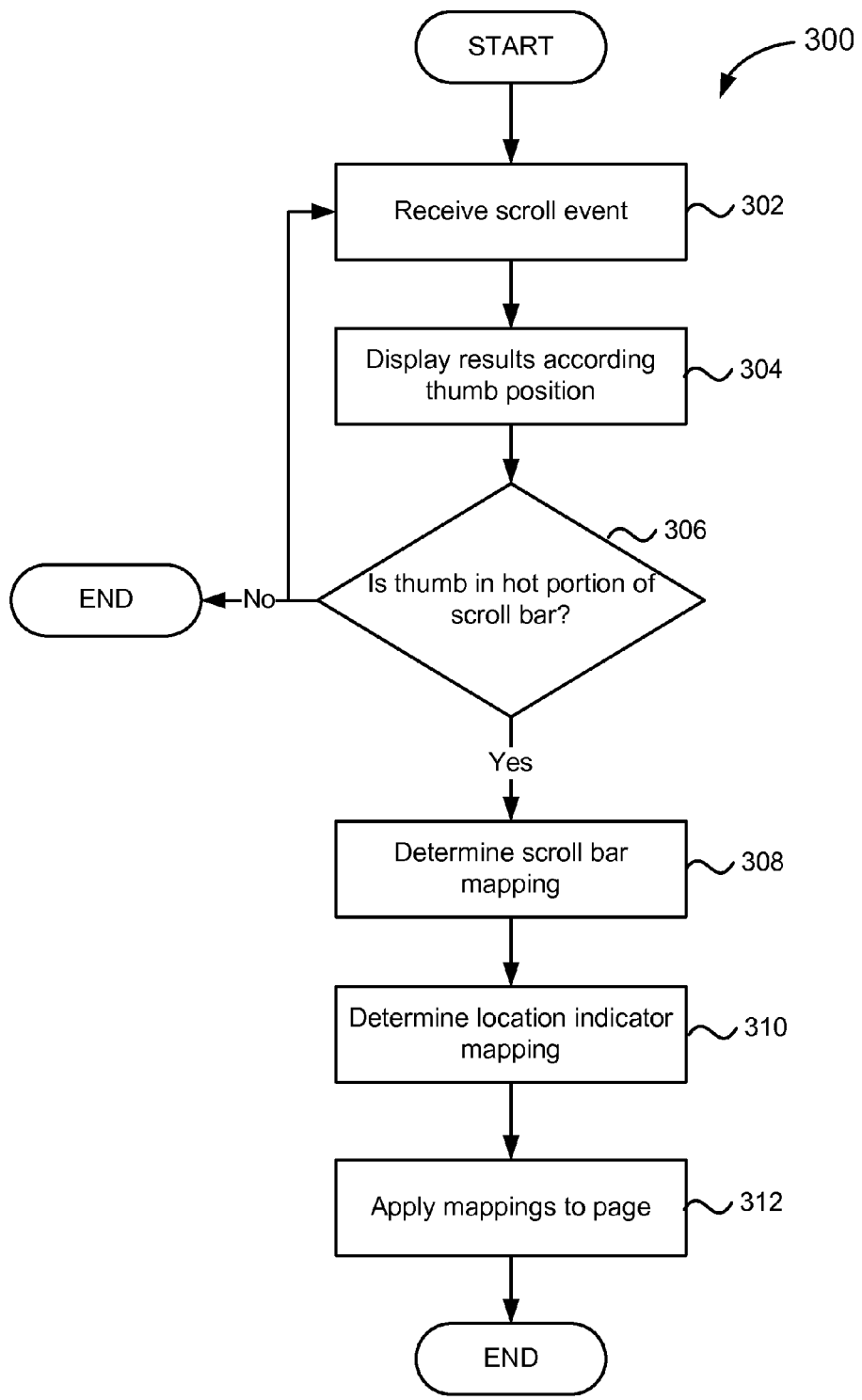
FIG. 3 shows a process for providing content, in accordance with an embodiment.

FIG. 3 shows diagrammatic representation of an example process 300 which may be used in order to achieve functionality corresponding to the example shown in FIGS. 2A-2F, or variations thereof. The process 300 shown in FIG. 3 may be executed by a web browser using appropriate JavaScript® instructions. Executable instructions for performing the process 300, or any process described herein or variation thereof, may be stored on one or more computer-readable storage media and may be performed under the control of one or more computer systems. As shown in FIG. 3, the process 300 may be performed upon receipt of search results, although the process 300 may be applicable to any information set. In an embodiment, a scroll event is received 302 upon receipt of user input for navigating through the search results. In an embodiment, the scroll event includes information about the scroll bar that is usable for scrolling through the search results. The information of the scroll event, in an embodiment, includes a position of a thumb of the scroll bar. Upon receipt of the scroll event, the search results are displayed 304 according to the position of the thumb. In an embodiment, each position on the scroll bar is mapped to a location in the search results such that, the position of the thumb being at a position on the scroll bar causes a search result corresponding to the position to be displayed, as well as possibly search results proximate to the corresponding search result.

In an embodiment, the scroll bar has a hot portion, which may be a lower portion of the scroll bar. As used herein, a "hot portion" is a portion of the scroll bar to which movement of the thumb causes retrieval of additional search results or other information. In an embodiment, JavaScript executing on a browser detects when the thumb of the scroll bar enters the hot portion and responsively requests the additional search results or other information. The hot portion of the scroll bar may be a percentage of the scroll bar's length, a fixed length, or otherwise. Accordingly, when a scroll event is received, a determination is made 306 whether the thumb is in the hot portion. If the thumb is not in the hot portion, the process 300 may end or a scroll event may be received again, such as if the user provides additional input for scrolling. If the thumb is in the hot portion of the scroll bar, a mapping of the scroll bar to a portion of the search results is determined 308, in an embodiment. Mapping the scroll bar to a portion of the search results may be accomplished in different ways in accordance with various embodiments. In one embodiment, prior to the thumb being moved to the hot portion, the scroll bar is already mapped to a portion of the search results and, upon movement of the thumb to the hot portion, the scroll bar is remapped to a set of search results that includes the portion of the search results previously mapped and additional search results. Each time the thumb is moved to the hot portion, a predetermined number of search results may be added to the set of search results to which the scroll bar is mapped. For example, ten search results may be initially mapped to the scroll bar. The first time the user moves the thumb to the hot portion, the scroll bar may be remapped to the first twenty search results. Then next time the user moves the thumb to the hot portion, the scroll bar may be remapped from the first twenty search results to the first thirty search results. This process may continue each time the thumb is moved into the hot portion until a predetermined maximum number of search results is mapped or all search results have been mapped. As noted above, additional search results may be requested by the user's browser and loaded (e.g., sent from a server to a user's browser) when the thumb is moved into the hot portion, although search results may be loaded in other ways, such as all at once or portion-by-portion independent of the thumb position.

Figure 4:
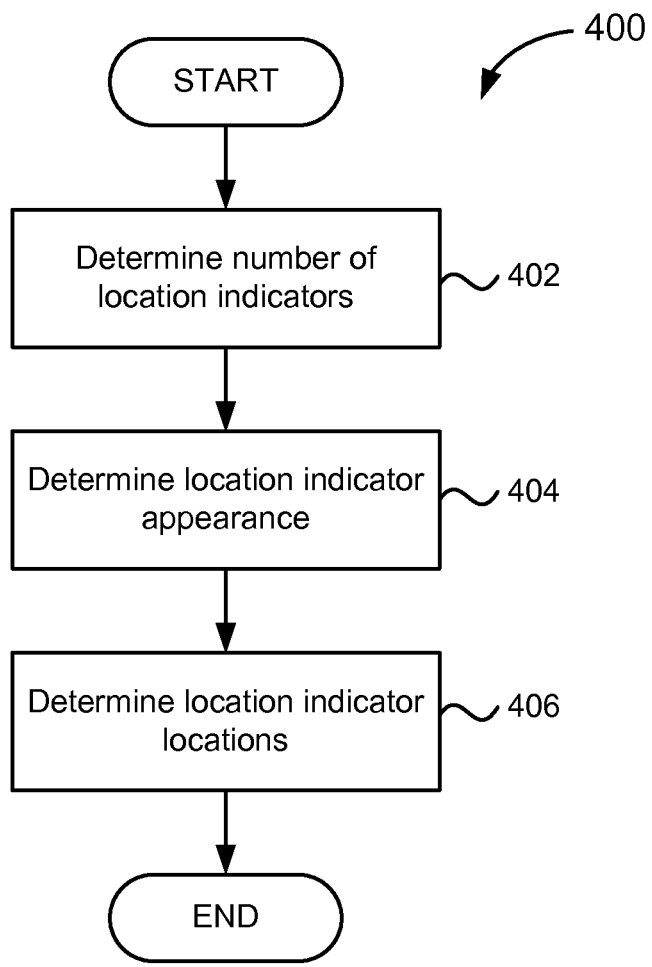
FIG. 4 shows a process for determining a mapping of location indicators that may be used in connection with the process of FIG. 3, in accordance with an embodiment.

In an embodiment, when the thumb is moved to the hot portion of the scroll bar, a mapping of location indicators to the scroll bar is determined 310. Determining the mapping of location indicators to the scroll bar may be performed in any suitable manner. One process for determining the mapping of location indicators is described below in connection with FIG. 4. Once the mapping of location indicators to the scroll bar is determined, in an embodiment, the mapping is applied 312 to the page that includes the search results. In other words, the location indicators are displayed to the user according to the mapping of the location indicators to the scroll bar. As described above, the location indicators may be numbers superimposed on the scroll bar or proximate to the scroll bar, although the location indicators may be any graphical devices that inform user input for navigating through the search results. In this manner, the user may use the location indicators to navigate to corresponding positions within the search results.

As mentioned above, FIG. 4 shows an example process 400 for determining a mapping of location indicators to a scroll bar. In an embodiment, the relative size of the scroll bar (e.g., based on resolution, display area, and/or other such factors) is used to determine 402 how many location indicators should be shown. The number of location indicators may be determined as the greatest integer less than or equal to the number of pixels of the scroll bar's height divided by a predetermined number, although similar or other calculations may be used. Once the number of location indicators is determined, in an embodiment, the appearance of each location indicator is determined 404. In embodiments where the location indicators include numerical values, the numerical values may be determined. Determining the numerical values may be performed in any suitable manner. In an embodiment, the numerical values for the location indicators will have uniform spacing between one another and a value for the spacing may be initially determined. The spacing may be the greatest integer less than or equal to the number of search results mapped to the scroll bar divided by the number of location indicators to be mapped to the scroll bar minus one. Thus, if seventy-five search results are mapped to the scroll bar and there are to be ten location indicators mapped to the scroll bar, the spacing would be seven (the greatest integer less than or equal to seventy-five divided by ten). The numerical values for the location indicators may begin at an initial value, such as one, and each successive location indicator will be determined as the value of the previous location indicators plus the spacing. Continuing the example having seventy-five search results and ten location indicators, the numerical values would be one, eight, fifteen, twenty-two, twenty-nine, thirty-six, forty-three, fifty, fifty-seven, sixty-four, and seventy-one. In other embodiments, the numerical values may be determined differently, such as to ensure that the numerical values are divisible by five or ten.

In an embodiment, when the appearance of the location indicators is determined, the locations of the location indicators on the scroll bar are determined 406. Determining the locations may be accomplished in any suitable manner. For instance, in an embodiment, the location on the scroll bar for each location indicator is determined as the location on the scroll bar mapped to the search result having the same number as the location indicator. For instance, in the example of the preceding paragraph, the location indicator having a numerical value of fifty-seven will have a location on the scroll bar that corresponds to the fifty-seventh search result. Likewise, the location indicator having a numerical value of fifteen would have a location on the scroll bar that corresponds to the fifteenth search result. Locations for the location indicators may also be determined using calculations that are based at least in part on the height of the scroll bar and the number of location indicators.

Figure 5:
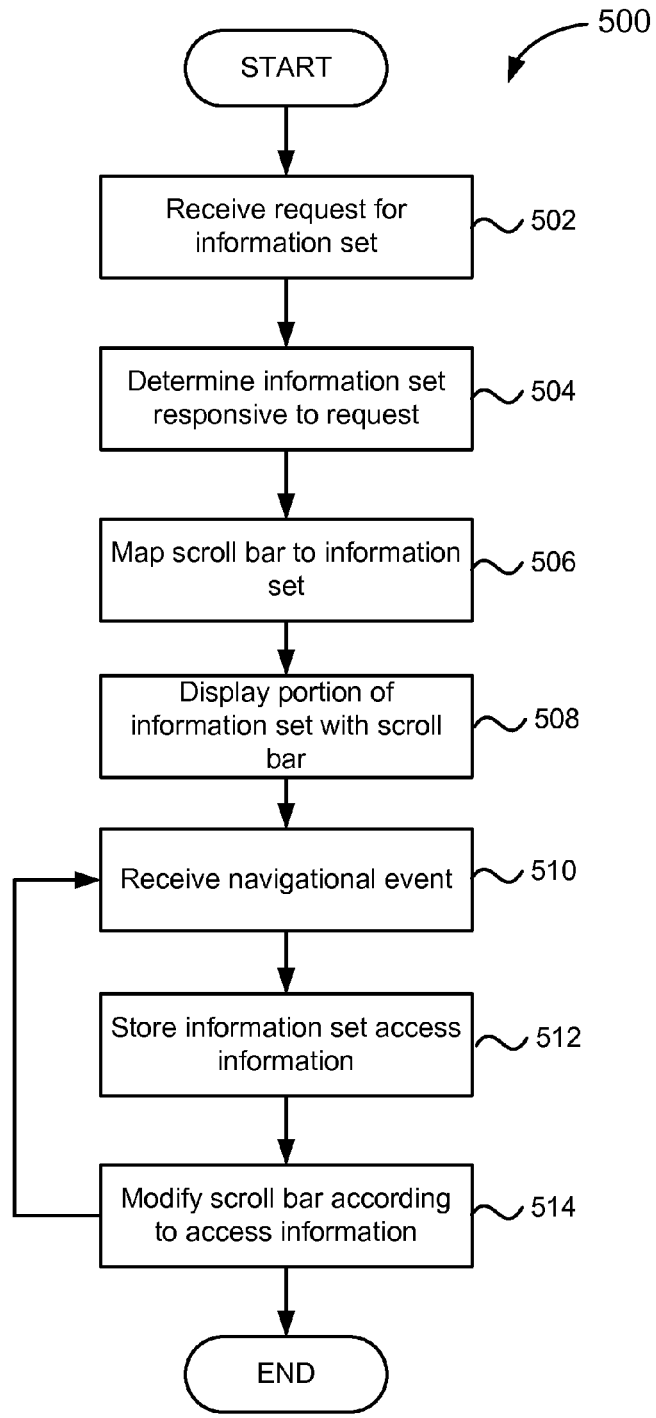
FIG. 5 shows a process for providing content, in accordance with an embodiment.

As noted above, variations of the above descriptions are contemplated as being within the scope of the present disclosure. FIG. 5, for example, shows a process 500 according to an embodiment of a variation of the above. The process 500 may be combined with the process 400 described above, or components thereof. In an embodiment, a request for an information set is received 502. Receipt of the request for an information set may be receipt of a search query entered by a user, although, generally, the request may be any request for a set of information. Examples include requests for content in general, requests to open documents, requests for enumerated units of information (such as album titles, song titles, document names, and the like) and others. Once the request is received, an information set responsive to the request is determined. For example, a set of search results responsive to a search query may be identified or, generally, any information set responsive to the request may be identified according to specific embodiments. The identified information set may be all available information units that are responsive to the request (such as all search results responsive to the search query), and/or may be a portion of all information that would be responsive to the request (such as the first search results, where n is a predetermined integer, such as one thousand).

When the information set is identified, the scroll bar is mapped 506 to the identified information set, in an embodiment. Mapping the information set to the scroll bar may be accomplished in any suitable manner, including in accordance with the above description. In an embodiment, the mapping is monotonic, with an upper location of the scroll bar being mapped to an initial portion of the information set and lower portion of the scroll bar being mapped to an end portion of the information set. With the mapping determined, a portion of the information set is displayed 508 with the scroll bar. For instance, in the context of search results, a portion of the search results is displayed with the scroll bar in an interface that allows a user to manipulate a thumb of the scroll bar to navigate through the search results. With the portion of the information set and scroll bar displayed to the user, a navigational event is received 508. A navigational event may be a scroll event, as described above, although it may be any event caused by user input for navigating through the search results, such as a touch pad related event, selection of a displayed location indicator, or generally, any event.

As the user navigates through the information set, access information related to the information set is stored 512. Access information may be any information that is indicative of portions of the information set accessed by the user. In one embodiment, portions of the information set are loaded as the user moves a thumb to corresponding locations on the scroll bar and not necessarily in sequential order. For instance, if the first ten search results of a set of search results have been initially loaded (sent to the user's computing device, in an embodiment) and the user moves the thumb of a scroll bar to a location corresponding to the hundredth search result, search results proximate to the hundredth search result (such as the hundredth through hundred-and-tenth search results or the ninety-fifth through one-hundred-and-fifth search results) may be loaded before the search results between the initially loaded search results and the search results proximate to the hundredth search result are loaded. If the user then moves the thumb to a location on the scroll bar corresponding to the sixtieth search result, the search results proximate to the sixtieth search result are loaded before others corresponding to locations on the scroll bar to which the user has not moved the thumb. In this embodiment, and others, the access information may identify the search results that have been loaded (sent to the user's computing device, in an embodiment). Access information may alternatively or additionally identify which portions of the information set have been displayed on the user's display. In the case of search results or other information sets having hyperlinks, the access information may alternatively or additionally identify which hyperlinks have been selected by the user.

The access information, in an embodiment, is used to modify 514 the scroll bar's appearance to the user to indicate to the user which portions of the information set have been accessed (loaded, displayed, selected, and/or the like). In this manner, if the user remembers that he or she saw a portion of the information set that is of interest but has navigated away from that portion of the information set, he or she can more easily locate the portion of interest, such as by moving the scroll thumb to locations that are indicated as corresponding to positions that have been accessed until he or she finds the portion of interest. An example of a web page that has a scroll bar modified according to the process described in FIG. 5 is provided in FIG. 6, which shows an example web page 600 similar to the web page 200 described above in connection with FIGS. 2A-2F.

Figure 6:
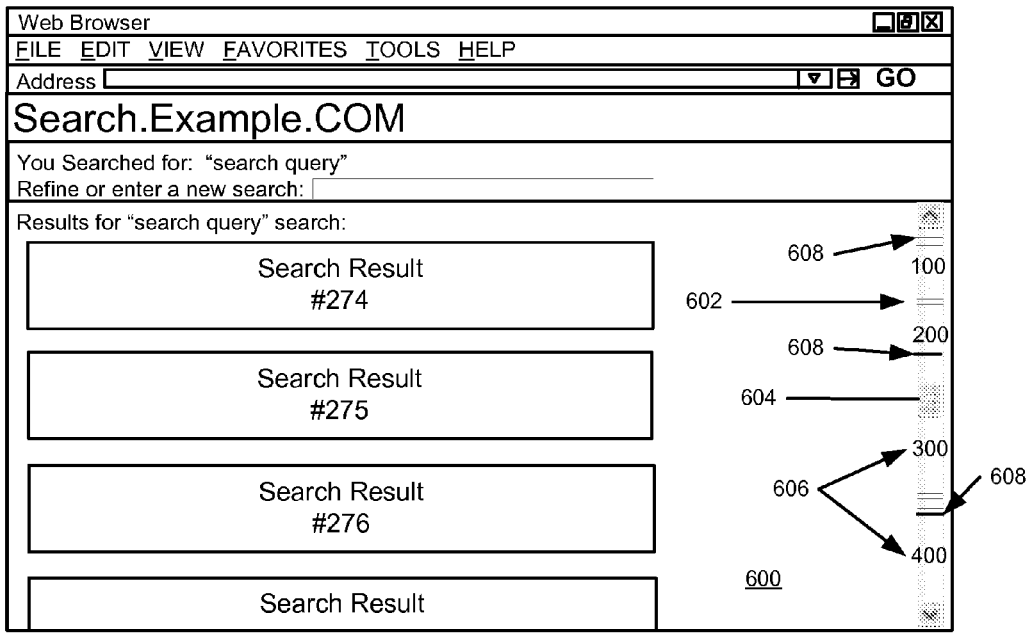
FIG. 6 shows an example of an interface illustrating an embodiment in which access information is used to modify a scroll bar.

As shown in FIG. 6, a web page 600 includes a plurality of search results and a scroll bar 602, which may operate in ways similar to the scroll bar 202 described above. In the example embodiment shown, the scroll bar 602 is mapped to some number of search results between four hundred and five hundred. The mapping of the scroll bar 602 to the search results may have been determined upon user submission of the search query to which the search results are responsive. In such an embodiment, the responsiveness (number of search results to which the scroll bar is mapped) of the scroll bar 602 may not change as the user scrolls to higher numbered search results. In another embodiment, the responsiveness of the scroll bar changes as the user scrolls to higher numbered search results, such as in a manner described above and, in this embodiment, the mapping of the scroll bar to portions of the search results may have changed several times until the display shown in FIG. 6 was achieved.

As shown in the figure, a thumb 604 of the scroll bar 602 has been moved to a location on the scroll bar 602 corresponding to the two hundred and seventy fourth search result and this search result is displayed on the web page accordingly. In addition, the scroll bar 602 includes a plurality of location indicators 606, which may be similar to location indicators described above. In addition, the scroll bar 602 includes a plurality of markings 608 on the scroll bar 602. In an embodiment, the markings provide a visual indication of portions of the search results accessed by the user. For example, upon user entry of the search query to which the search results in the figure are responsive, the first few search results may have been sent to the user. The user then may have moved the thumb 604 to various positions on the scroll bar 602 and search results corresponding to the various positions were sent to the user accordingly. In this example, the markings 608 may correspond to portions of the search results that were sent to the user's computing device. The markings may also correspond to locations on the scroll bar 602 that have been displayed on the user's computing device, that have been displayed for at least a threshold period of time indicating user interest in the portions. Also, the markings may correspond to search results that the user has selected or, generally, to locations on the scroll bar 602 in which the user has expressed interest. In addition, different markings may have different significance and may have a different appearance (such as a different color) to indicate different significances. For instance markings of one color may indicate loaded search results while markings of another color may indicate search results that have been displayed on a user's device for at least a threshold period of time.

Figure 7:
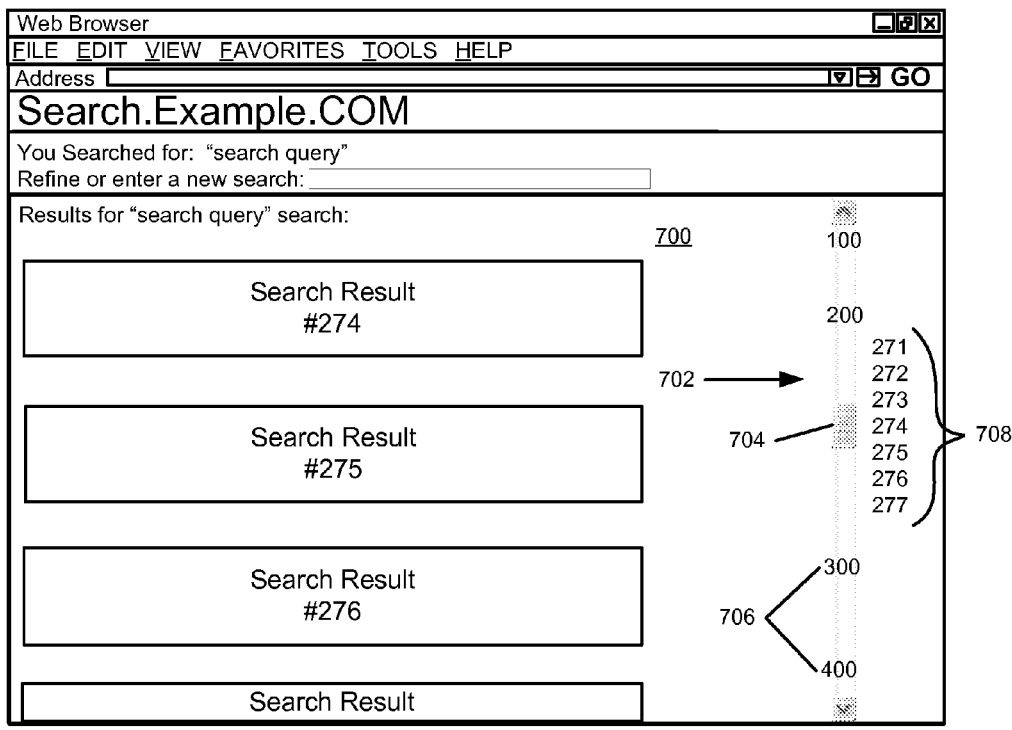
FIG. 7 shows another example of an interface illustrating an embodiment in which a thumb map is provided.

FIG. 7 shows another variation of an example web page 700 which may be produced using techniques described above. In this example, the web page includes a plurality of search results and a scroll bar 702 having a scroll thumb 704. Also, the scroll bar 702 has a plurality of location indicators 706. The scroll bar 702, thumb 704, and location indicators 706 may be similar to the scroll bar 202, thumb 204, and location indicators 206 described above. As described above, the scroll bar 702 may be mapped to a set of search results. As shown in the figure, as indicated by the location indicators 706, the scroll bar is mapped to a number of search results between four hundred and five hundred. In the example embodiment shown in FIG. 7, the web page 700 also includes a thumb map 708. The thumb map 708, in an embodiment, is a graphical map of a portion of the search results that corresponds to locations on the scroll bar proximate to the location of the thumb 704 relative to the scroll bar 702. As shown in the figure, the thumb map 708 uses its own location indicators to identify search results corresponding to the location of the thumb and those proximate to it. For instance, the thumb map 708 shown includes integers between "271" and "277" as the thumb 704 is located on the scroll bar at a location corresponding to the two-hundred and seventy fourth search result. The thumb map 708 may be any map that shows greater detail than other location indicators on the scroll bar 706.

In an embodiment, as the thumb 704 is moved relative to the scroll bar 702, the thumb map 708 is updated accordingly to show details of search results mapped to a region proximate to the thumb's location on scroll bar. Thus, if the user were to move the thumb to a location on the scroll bar 702 corresponding to the twentieth search result, the thumb map 708 would show details of search results mapped to a region on the scroll bar 702 proximate to the location mapped to the twentieth search result. The location of the thumb map 708 may move with the thumb to remain proximate to the thumb. In addition, while the figure shows the thumb map 708 as a list of numbers corresponding to search results next to the thumb 704, other variations are contemplated as being within the scope of the present disclosure. For example, a list of numbers may curve around the thumb 704 or, generally, have a different appearance than shown in the illustrative example. As another variation, the thumb map 708 may show information other than numbers corresponding to positions of search results within a set of search results. For example, the thumb map 708 may include titles or portions of titles of landing pages of corresponding search results and/or domain names of landing pages of corresponding search results. Generally, for any information set, the thumb map 708 may include information related to the corresponding portions of the information that is useful to the user.

In an embodiment, information in the thumb map 708 is selectable by the user through user input. Selection of a portion of information of the thumb map 708, such as selection of a number of the thumb map, may cause navigation to a corresponding search result. Thus, for instance, if the user selects "271" in the thumb map 708, the two hundred and seventy first search result may be displayed in an appropriate location on a user's display. Other variations of the above described embodiments are also possible. For instance, in one embodiment, a thumb may have a transparent appearance so that, when the thumb is moved over a location indicator, the thumb appears to be transparent with the location indicator being seen through the thumb. In another embodiment, a thumb map appears on the thumb itself. In yet another embodiment, the thumb map includes a second scroll bar. In such an embodiment, referring to FIG. 7 for reference, the user may use the scroll bar 702 to navigate to an approximate position within the search results and may use the thumb map scroll bar to more accurately scroll. For example, in the example of FIG. 7, the thumb map may include a scroll bar mapped to the two hundred and seventy first search result through two hundred and seventy seventh search results while the scroll bar 702 is mapped to over four hundred search results. Generally, the thumb and scroll bar may have any suitable appearance and may include features not described in the present disclosure.

In addition, while scroll bars and search results are used in the above description for the purpose of illustration, the above-described techniques are also applicable navigation through any information set using an interface that may or may not include a scroll bar. For example, in one embodiment, a scroll bar is not visible, but touch screen input or other input may be used to scroll through an information set. Location indicators may be displayed in the interface (such as along a side of a display screen) and may be modified as the user scrolls through the information set, such as in ways similar to those described above. In such an embodiment, the location indicators may be selectable to allow navigation to corresponding portions in the information set, as described above. Generally, the location indicators may be any graphical devices that inform user input for navigating through a scrollable information set. Other variations are also contemplated as being within the scope of the present disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of providing information to a user, comprising:
    under the control of one or more computer systems configured with executable instructions,
        receiving a request for search results from a user computing device;
        responsive to the request:
            identifying a set of search results responsive to the request; and
            providing instructions to the user computing device that enable the user computing device to:
                display a subset of the provided search results concurrently with a scroll bar having a scroll thumb and a number of location indicators, the location indicators specifying numbers corresponding to search results, a position of the scroll thumb being modifiable through user input, wherein the one or more location indicators are dynamically remapped by modifying the graduation of the numbers based at least in part upon the position of the scroll thumb;
                receive user input for causing a positioning of the displayed scroll bar thumb to be proximate to a terminal end of the scroll bar; and
            in response to receipt of the user input:
                display at least a portion of the search results additional to the subset; and
                modify the appearance of the scroll bar such that each location indicator of the one or more location indicators corresponds to a position among the subset of the provided search results and indicates a location on the scroll bar to which the scroll thumb may be moved in order to cause display of one or more of the subset of the provided search results at or proximate to the position;
            wherein the search results are numbered and wherein at least one of the location indicators identifies a number of a corresponding search result; and
            the number of location identifiers is identified as the integer which is less than or equal to a number of pixels of a height of the scroll bar divided by a predetermined number.

2. The computer-implemented method of claim 1, wherein the search results are numbered and wherein at least one of the location indicators identifies a number of a corresponding search result.

3. The computer-implemented method of claim 1, wherein the instructions further enable the user computing device to request and receive said at least a portion of the search results additional to the subset to the user computing device.

4. The computer-implemented method of claim 3, wherein at least one of the one or more location indicators differentiates between search results that have been sent to the user computing device and search results that have not been sent to the user computing device.

5. The computer-implemented method of claim 1, wherein a plurality of the one or more location indicators each visually indicates a different corresponding category of search results, the category being selected from the group consisting of search results that have been sent to the user computing device, search results that have not been sent to the user computing device, search results that are in a process of being sent to the user computing device, search results that have been displayed by the user computing device, search results to which the user has navigated, and search results that were unable to be sent to the user computing device.

6. A computer-implemented method of modifying a display, comprising:
    under the control of one or more computer systems configured with executable instructions,
        receiving a request for a scrollable information set from a client device;
        responsive to the request, providing to the client device instructions that enable the client device to:
            display a portion of the requested scrollable information set;
            receive user input for causing display of information of the scrollable information set additional to the displayed portion; and
            in response to receipt of the user input:
                display at least a portion of the additional information; and
                display a number of location indicators with the additional information, the location indicators specifying numbers, wherein the one or more numbers are dynamically remapped and the graduation of the numbers is modified based at least in part on the position of a scroll thumb within a scroll bar, and wherein each location indicator of the one or more location indicators corresponds to a position within the scrollable information set that has already been displayed and is configured to facilitate user input for navigating to the corresponding position;
    wherein at least one of the location indicators identifies a number of a corresponding search result; and
    the number of location identifiers is identified as the integer which is less than or equal to a number of pixels of a height of the scroll bar divided by a predetermined number.

7. The computer-implemented method of claim 6, wherein the user input corresponds to manipulation of the scroll bar and wherein the one or more location indicators identify one or more corresponding scroll bar locations on the scroll bar.

8. The computer-implemented method of claim 7, wherein causing display of one or more location indicators includes causing display of a map that identifies a particular portion of the scrollable information set corresponding to a current position of the thumb.

9. The computer-implemented method of claim 8, wherein the thumb occupies an area of a display and wherein causing display of the map includes causing the map to display on the area occupied by the thumb.

10. The computer-implemented method of claim 7, wherein the one or more location indicators inform user input that is independent of scrolling.

11. The computer-implemented method of claim 6, wherein the scrollable information set comprises a set of search results.

12. A non-transitory computer-readable storage medium having stored thereon instructions for causing one or more computer systems to perform a method of providing information, the method comprising:
    displaying a first subset of an information set in connection with a user interface that includes:
        a scrolling control for scrolling within the information set; and
        a set of a number of graphical location indicators that are dynamically remapped when a position of the scrolling control is modified, the graphical location indicators specifying numbers, wherein the dynamic remapping causes the graduation of the numbers to be modified based at least in part upon the position of the scrolling control;
    receiving user input through the scrolling control; and
    responsive to the user input through the scrolling control:
        displaying, based at least in part on the user input, a second subset of the information set;
        determining the set of one or more graphical location indicators, each graphical location indicator corresponding to a location within the information set and configured to facilitate user input for navigating to the corresponding location within the information set, at least one of the graphical location indicators corresponding to an undisplayed location within the information set; and
        causing the determined one or more graphical location indicators to be displayed with the second subset;
    wherein at least one of the one or more graphical location indicators identifies a number of a corresponding search result; and
    the number of graphical location identifiers is identified as the integer which is less than or equal to a number of pixels of a height of the scroll bar divided by a predetermined number.

13. The non-transitory computer-readable storage medium of claim 12, wherein the scrolling control is a scroll bar.

14. The non-transitory computer-readable storage medium of claim 13, wherein the scroll bar has a thumb and wherein at least one of the graphical location indicators indicate a position on the scroll bar to which the scroll bar may be moved in order to cause display of one or more corresponding location within the information set.

15. The non-transitory computer-readable storage medium of claim 12, wherein the information set comprises a set of numbered information units and wherein at least one of the graphical location indicators comprises a number of a corresponding information unit.

16. A system for providing content, comprising:
    a data store having data stored therein;
    one or more computing devices each comprising a processor, the one or more computing devices collectively operable to:
        receive a request for information; and
        in response to the request for information, provide to a client device instructions that enable the client device to:
            display a portion of the requested information;
            display a scroll bar having a scroll thumb and a number of location indicators, the one or more location indicators specifying numbers, a position of the scroll thumb being modifiable through user input, wherein the one or more location indicators are dynamically remapped when the position of the scroll thumb is modified, wherein the dynamic remapping causes the graduation of the numbers to be modified based at least in part upon the position of the scrolling control;
            receive user input for causing display of information additional to the displayed portion; and
            in response to receipt of the user input:
                cause display of at least a portion of the additional information;
            wherein the search results are numbered and wherein at least one of the location indicators identifies a number of a corresponding search result; and
            the number of location identifiers is identified as the integer which is less than or equal to a number of pixels of a height of the scroll bar divided by a predetermined number.

17. The system of claim 16, wherein the user input corresponds to user manipulation of a scroll bar.

18. The system of claim 17, wherein at least one of the location indicators indicates a location on the scroll bar to which the thumb may be moved in order to cause display of a corresponding portion of the requested information.

19. The system of claim 16, wherein the one or more location indicators are part of a map of the requested information and wherein instructions further enable the client device to cause display of a secondary map of a subset of the requested information.

20. The system of claim 16, wherein the instructions enable the client device to cause display of a map of at least a portion of the requested information and modify the map responsive to access of portions of the requested information.

* * * * *